United States Patent Office 3,500,193
Patented Mar. 10, 1970

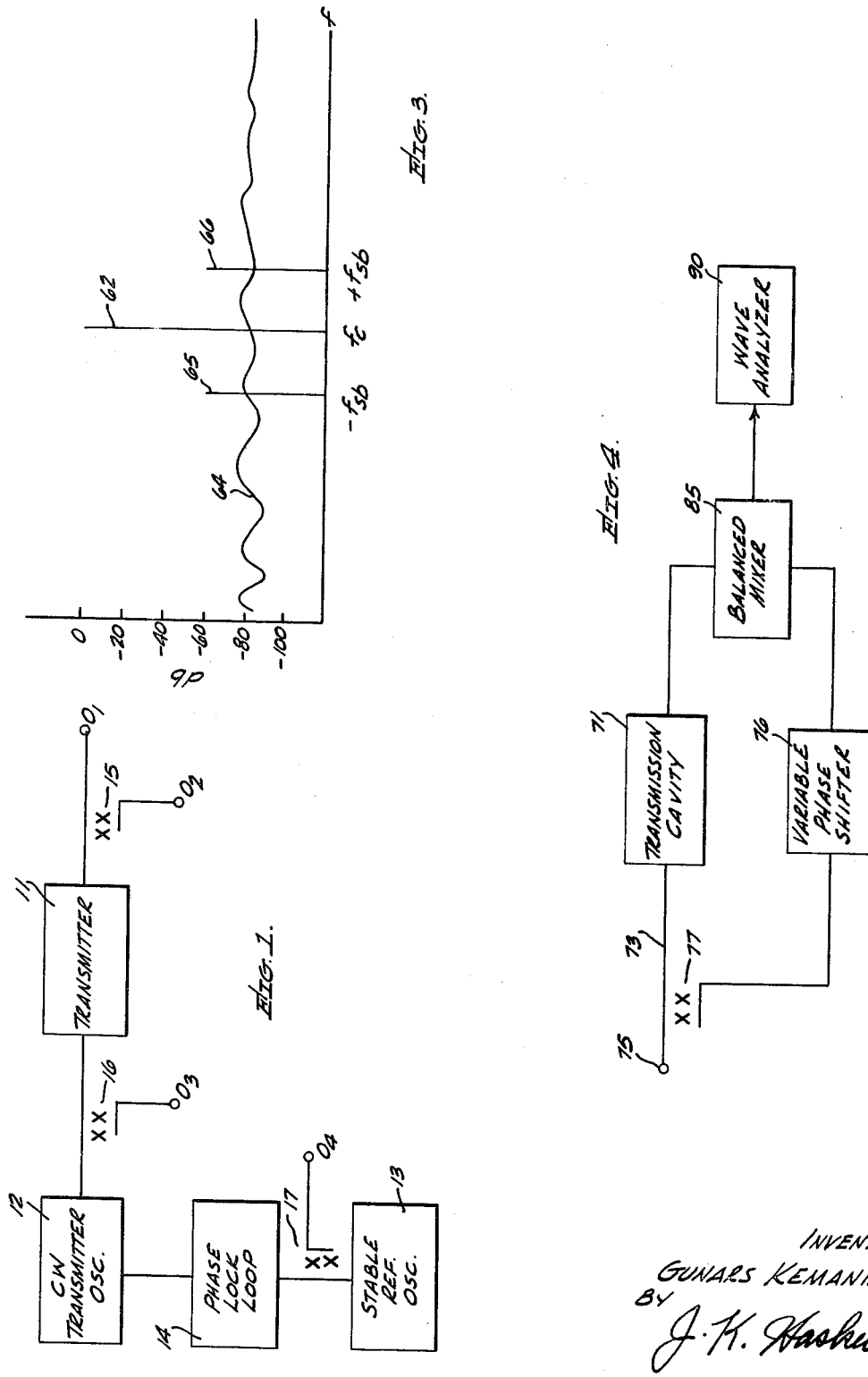

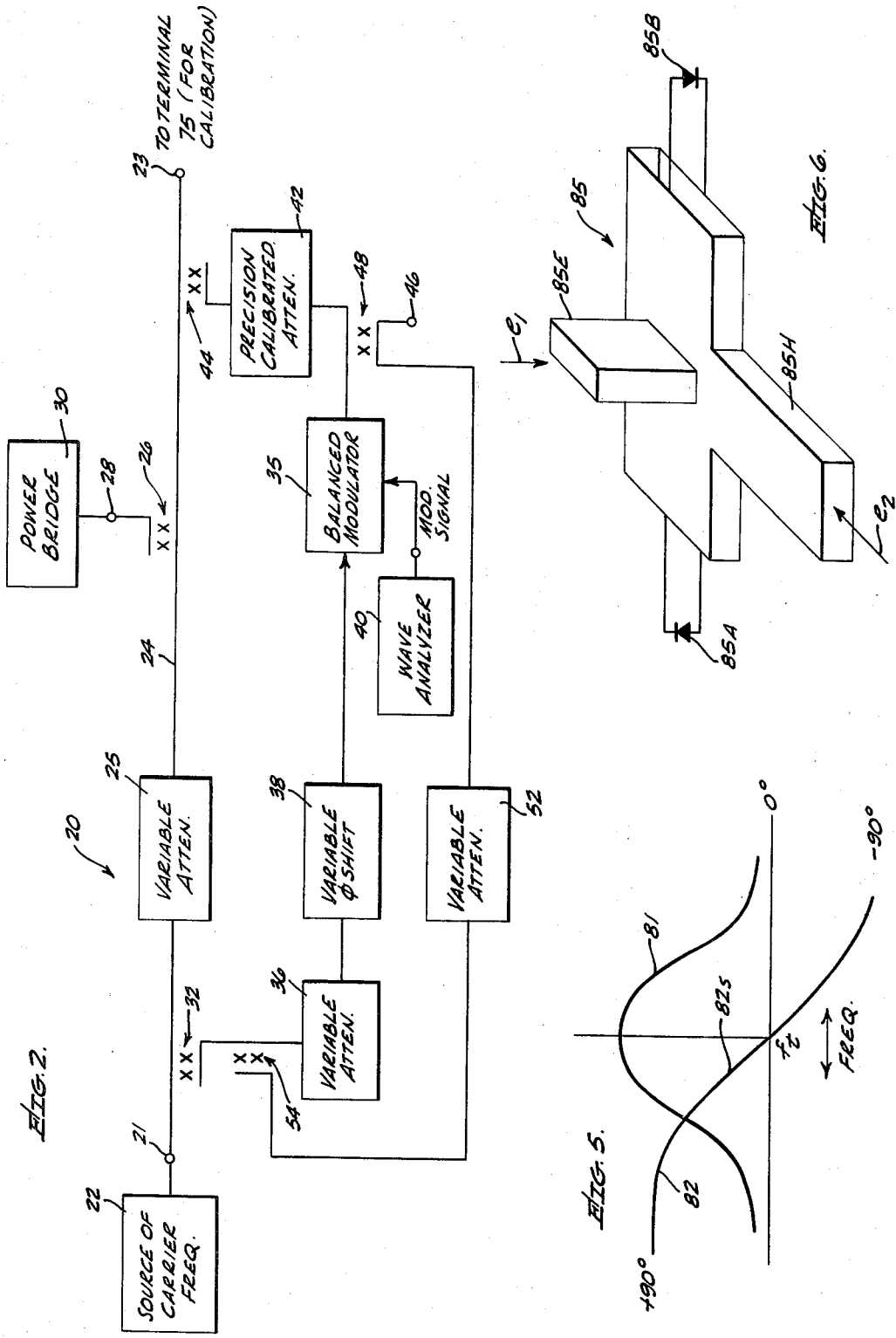

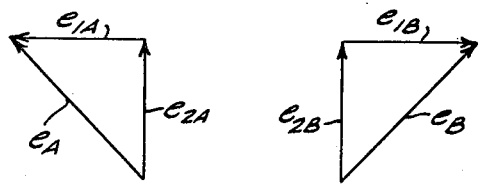
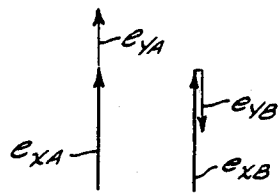
Fig. 7.
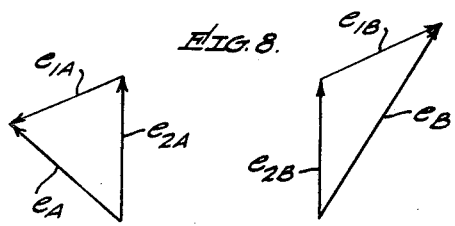
Fig. 8.
Fig. 11.
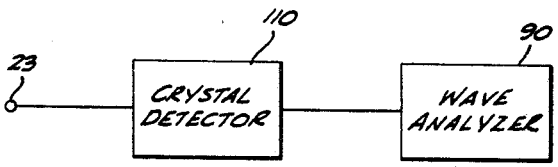
Fig. 10.
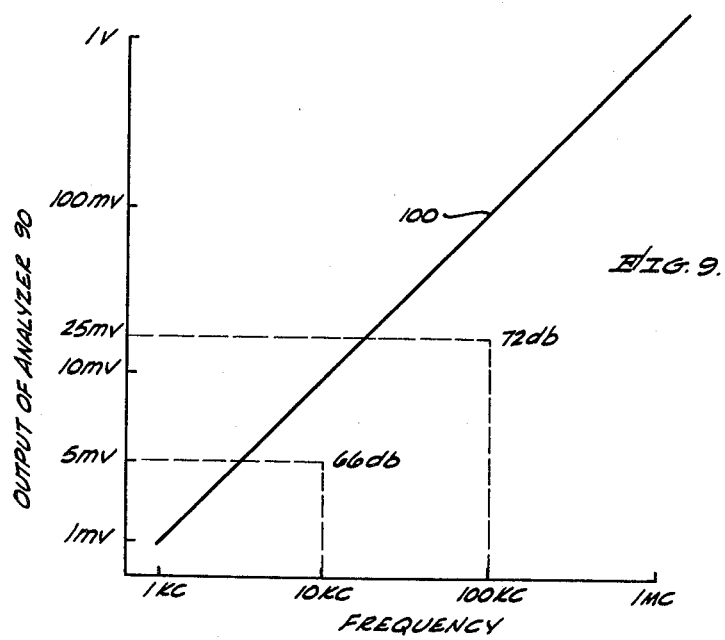
Fig. 9.

3,500,193
SYSTEM FOR MEASURING NOISE SPECTRA
ADJACENT TO A CARRIER SIGNAL
Gunars Kemanis, Manhattan Beach, Calif., assignor to
Hughes Aircraft Company, Culver City, Calif., a corporation of Delaware
Filed June 2, 1966, Ser. No. 554,905
Int. Cl. G01r 23/16
U.S. Cl. 324—77        8 Claims

ABSTRACT OF THE DISCLOSURE

This system measures the absolute ratio of signal-to-noise in microwave signals with respect to a predetermined carrier frequency at relatively small frequency separations from the carrier frequency. A calibration portion of the system provides a pair of sidebands at a known carrier-to-sideband ratio above the expected carrier-to-noise ratio to be measured. A measuring portion of the system responds to the calibrated signal to develop a reference output signal which is compared with output signals provided by the carrier signal with noise of unknown levels. The measuring portion of the system may be adjusted to indicate the noise levels over a wide range of frequency separation from the carrier frequency.

---

This invention relates to a signal measuring system and more particularly to a method and system for measuring the noise spectra of microwave signals close to the carrier frequency.

The use of microwave signals in communication and tracking systems is well known. They are extensively employed in various types of radar systems. In Doppler radar, for example, microwave signals at a given frequency known as the carrier frequency are transmitted toward a target and their echoes received with the frequency shifts produced by the Doppler phenomenon being used to determine the relative velocity between the target and the signal transmitter. It is appreciated that since in such a radar system the information derived is based on frequency shifts of the echoes with respect to the carrier frequency, it is vitally important to know the spectral characteristics of the transmitted signals.

Since the transmitted carrier frequency is not noiseless, it is necessary to be able to measure the noise spectra close to the carrier frequency, which is the frequency region where target returns are expected. Even for Doppler shifts of tens of kilocycles, the noise spectrum, only a few kilocycles from carrier may be important due to main lobe clutter returns. The frequency separation from the carrier for which the measurements are important may range from a few kc. (kilocycles) to perhaps as high as one mc. (megacycle). Also, within this range of frequency separation, the carrier-to-noise ratio should be of high enough an order to be compatible with the Doppler radar system's performance requirements.

Several methods have been used during the past few years to measure noise spectra, whether AM (amplitude modulation) or FM (frequency modulation) of microwave signals close to a carrier frequency. However, prior art methods have been found to be quite limited because of their complexity, lack of versatility or limited sensitivity. In some methods, the frequency separation from the carrier at which the noise can be measured is quite limited, while in others the carrier-to-noise power ratio is of a limited order. Also, many prior art methods require the use of a reference signal source which is assumed to be noiseless to measure the noise spectra of the transmitted signals. Since however no practical reference signal source is truly noiseless, the noise measurements attained when using such a source are limited by the noise thereof.

Accordingly, it is an object of the present invention to provide a new improved system for measuring noise spectra of microwave signals with respect to a selected frequency.

Another object is to provide a relatively simply and versatile system for measuring noise spectra of microwave signals close to a preselected carrier frequency.

Yet another object is the provision of an improved system for measuring the absolute noise spectra of microwave signals with respect to a preselected frequency.

A further object is the provision of a method and system for measuring FM or AM noise spectra of microwave signals close to a carrier frequency, with the noise being measurable in a frequency separation from the carrier frequency which ranges from a few kc. to over one mc.

Still a further object is to provide a relatively simple method and system for measuring the absolute ratio of signal-to-noise in microwave signals with respect to a predetermined carrier frequency in a frequency separation between the carrier frequency and the measured noise frequency which may selectively vary from a few kc. to over one mc. and with a ratio sensitivity on the order of 80 db relative to a one kilocycle bandwidth for absolute FM noise measurements and in excess of 100 db for relative AM and FM and for absolute AM noise measurements.

These and other objects of the invention are achieved by utilizing in a calibration portion of the system the source whose noise is to be examined to provide a pair of sidebands at a known carrier-to-sideband ratio which is above the expected carrier-to-noise ratio to be measured. The known carrier-to-sideband ratio is then measured in the measuring portion of the system to provide a reference output signal proportional thereto. Output signals provided by the carrier frequency with noise of unknown levels are then compared with the reference output signal to provide a measure of the ratio of the carrier frequency to the unknown noise. By adjusting the frequency to which the measuring portion of the system responds, the noise level in a frequency separation from the carrier frequency within the system limitation is determined.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a simple block diagram of circuitry useful in highlighting the problem of measuring absolute and relative noise in a transmitter;

FIGURE 2 is a block diagram of the calibrating circuit of the noise measuring system of the present invention;

FIGURE 3 is a simple frequency spectrum of a carrier signal surrounded by noise and a pair of discrete sidebands, added for calibration purposes;

FIGURE 4 is a simple block diagram of the measurement circuit of the present invention;

FIGURE 5 is a diagram useful in explaining the characteristics of the transmission cavity shown in FIGURE 4;

FIGURE 6 is a perspective view of one embodiment of a balanced mixer, shown in FIGURE 4;

FIGURES 7 and 8 are vector diagrams useful in explaining the operation of the measurement circuit of FIGURE 4;

FIGURE 9 is a graph representing the output of the wave analyzer of FIGURE 4 as a function of frequency;

FIGURE 10 is a simplified diagram for absolute AM noise measurements; and

FIGURE 11 is a vector diagram useful in explaining relative AM measurements.

Attention is first directed to FIGURE 1 which is a simplified block diagram of a Doppler transmitter. It is shown comprising a transmitter 11 driven by a continuous wave (CW) transmitter oscillator 12 which is locked to a stable reference oscillator 13 through a phase lock loop 14. The output of transmitter 11 is shown connected to an output terminal $O_1$ and through a coupler 15 to an output terminal $O_2$. Similarly, the output of oscillators 12 and 13 are shown coupled by means of couplers 16 and 17 to output terminals $O_3$ and $O_4$ respectively. As is appreciated, relative noise measurements can be conveniently performed by comparing a pair of outputs in a microwave phase or amplitude detector and by examining the spectrum at the detector output on a wave analyzer. Thus, for example, the outputs at output terminals $O_2$ and $O_3$ can be compared to determine the AM (amplitude modulation) and FM (frequency modulation) noise contributed by the transmitter 11 alone.

Similarly, the outputs at output terminals $O_2$ and $O_4$ can be compared to find the total noise of the transmitter oscillator 12 and at the transmitter 11. However, the total noise at the output terminal $O_1$ representing the transmitter output, also includes noise contributed by the stable reference oscillator 13. Thus, the noise measurement is relative to the output of oscillator 13.

To provide a noise measurement at output terminal $O_1$ which includes the noise contributed by oscillator 13, it is necessary to employ an additional reference oscillator whose noise level is much lower (at least 20 db) than the noise levels measured at output terminal $O_1$, with the noise of the stable reference oscillator being assumed to be zero. One of the principal features of the present invention is the ability to measure the total or absolute noise level including the contribution from the stable reference oscillator, such as oscillator 13 without resort to an additional independent, essentially noise-free reference signal.

Hereafter, by absolute noise measurement is meant the measurement of noise representing the sum total of all noise contribution in the system including the reference oscillator without resort to a separate stable reference signal which must be essentially noise-free. On the other hand, a relative noise measurement implies that the measured value represents the noise contributions of only one or more but not all of the main noise sources in the transmitter. For relative measurements, a reference signal must always be used whose noise is cancelled out in the measurement process.

Briefly, the invention includes a calibration circuit in which a pair of sidebands are added to the source to be tested. The power of the sidebands is directly measured. The accuracy of the sideband power measurement is enhanced by nulling any effect of carrier frequency leakage into the sideband measurement portion of the calibration circuit. As a result, the carrier frequency power and the sideband power levels are known and therefrom the exact carrier-to-sideband power ratio is determined.

The carrier and sidebands are then used to calibrate the measuring circuit of the system by providing an output signal which is a function of the carrier-to-sideband power ratio. The sidebands are added to the carrier in the required phase for AM or FM, depending on which type of noise is to be measured. Thereafter, the noise spectra of signals close to the carrier frequency are determined by continuously monitoring the output of different noise frequencies.

Attention is now directed to FIGURE 2 which is a block diagram of the calibrating circuit of the noise measuring system of the present invention. Calibrating circuit 20 includes an input terminal 21, shown connected to a source 22 of carrier frequency $f_c$ and an output terminal 23 which is connected to the noise measuring circuit of the system which will be described hereafter in detail. Input terminal 21 is connected to output terminal 23 by a line 24 through a variable attenuator 25. A microwave coupler 26 of a known coupling value such as 20 db is used to couple a terminal 28 to line 24. By connecting a power measuring device such as a power bridge to terminal 28, the carrier frequency power, hereafter also referred to simply a carrier power, at the output terminal 23 can be adjusted to a desired value by adjusting the variable attenuator 25. Assuming that the desired carrier power at terminal 23 is 0 db and the coupling value of coupler 26 is —20 db, then the power at terminal 28 and any reading on power bridge connected thereto such as bridge 30 is 20 db below the power at terminal 23.

The calibrating circuit 20 also includes circuitry for generating a pair of sidebands at a precisely known power relation with respect to the carrier power at terminal 23. These circuits include a microwave coupler 32 which samples some of the carrier power at input terminal 21 and applies it to a balanced modulator 35 through serially connected variable attenuator 36 and variable phase shifter 38. A sinusoidal modulating signal such as from a modulating signal source as may be supplied from a wave analyzer 40 is also supplied so that the output of modulator 35 is a pair of sidebands separated from the carrier by the frequency of the modulating signal. The output of the modulator 35 i.e. the two sidebands are applied to output terminal 23 through a precision calibrated attenuator 42, the output of which is coupled to line 24 by means of a coupler 44.

As is appreciated by those familiar with the art, the sideband power at terminal 23 is a function of the output power of modulator 35, the attenuation value of attenuator 42, and the coupling value of coupler 44. The output of modulator 35 may be determined by connecting the power bridge 30 to a sideband terminal 46 which is coupled to the output of modulator 35 via a 3 db hybrid coupler 48 and adjusting the modulating signal amplitude so that the reading on the power bridge is equal to the reading on the bridge when the carrier power was measured so that the sideband power at the output of modulator 35 is below the carrier power by the coupling value of coupler 26. Then knowing the attenuation factor of attenuator 42 and the coupling value of coupler 44, the carrier-to-sideband power at terminal 23 is precisely determined.

For example, let it be assumed that the coupling values of each of couplers 26 and 44 is 20 db and the attenuation value of attenuator 42 is also 20 db. Then by noticing the reading on bridge 30 when the carrier power is adjusted to a reference power of 0 db and then connecting the bridge to terminal 46 and adjusting modulating signal amplitude so that the reading on the bridge is the same, the sideband power at the output of modulator 35 is 20 db below that of the carrier. With attenuator 42 and coupler 44 presenting an additional attenuation of 40 dbs the carrier-to-sideband power at terminal 23 is precisely 60 db. To enhance the accuracy of the power measurement of the sidebands at the output of modulator 35, the calibrating circuit 20 includes a variable attenuator 52, the input of which is coupled to receive a sample of the carrier signal from a coupler 54. The output of attenuator 52 is coupled to the output of modulator 35 by means of 3 db coupler 48. Attenuator 52 and phase shifter 38 are adjustable to null any carrier leakage at the output of the coupler 48 at which the sideband power measurement is made. Thus the power measurement is a function of only the sidebands from modulator 35.

The calibrated sideband power is chosen to be considerably above the expected noise to be measured. For example as seen from FIGURE 3, to which reference is made herein, let us assume that the power of the carrier frequency $f_c$ designated by the line 62 is 0 dbm and the expected noise designated by line 64 to be measured there-about is about —80 db with respect thereto. Then in accordance with the teachings of the invention, the power of the two sidebands $-f_{sb}$ and $+f_{sb}$, designated by lines 65 and 66 used for calibration purposes is substantially above the noise level. In FIGURE 3, the sideband power is shown to be 60 db below the carrier power and about 20 db above the expected noise level.

The type of modulation produced by the sidebands may be conveniently controlled by means of variable phase shifter 38 and a crystal detector (not shown) coupled to output terminal 23. The output of the detector is connected to an AC meter. For pure FM modulation, the shifter 38 is adjusted until the meter reading is a null while for pure AM modulation, the shifter is adjusted until the reading of the meter is maximized.

Attention is now directed to FIGURE 4 which is a block diagram of the measuring circuit of the present invention. It is shown including a transmission cavity 71 connected via line 73 to an input terminal 75. It should be appreciated that line 73, as well as the other lines shown in the figures, represent means capable of transmitting therethrough signals in the microwave frequency region. Similarly, all couplers are of the type capable of coupling one microwave to another. A variable phase shifter 76 is coupled to line 73 by means of a microwave coupler 77. Thus microwave signals at terminal 75 are supplied simultaneously to transmission cavity 71 and phase shifter 76. As is appreciated by those familiar with the art, the cavity 71 may be thought of as a resonant circuit having amplitude and phase shift characteristics as diagrammed in FIGURE 5, to which reference is made herein. Bell-shaped curve 81 represents the output amplitude of cavity 71 as a function of frequency of the input signal, $f_t$ representing the tuned cavity frequency. Curve 82 represents the phase characteristic of the output introduced by the cavity as the signal frequency varies above or below the tuned frequency $f_t$.

Whereas the cavity introduces a substantial phase shift as the input frequency varies from $f_t$, the phase shift introduced by the path through the phase shifter 76 as a function of frequency of the input signal may be thought of as substantially zero. The outputs of the cavity 71 and phase shifter 76 are connected to a balanced mixer 85. One embodiment of the balanced mixer 85 in conjunction with which the invention will hereafter be described, is a magic-T arrangement shown in FIGURE 6, to which reference is made herein. The $e_1$ input from cavity 71 is supplied to the mixer through E arm designated 85E while the $e_2$ signal from phase shifter 76 is supplied to H arm 85H. The output of the mixer is the combined signal at the two oppositely connected crystals 85A and 85B, hereafter also referred to as crystals A and B.

In practice, the cavity 71 is tuned to the carrier frequency $f_c$ and the phase shifter 76 is adjusted so that the two inputs to mixer 85 from the cavity 71 and phase shifter 76 designated $e_1$ and $e_2$ respectively are in phase quadrature.

The signal components of signals $e_1$ and $e_2$ at crystals 85A and 85B (FIGURE 6) may be represented vectorially as shown in FIGURE 7, where vectors $e_{2A}$ and $e_{2B}$ represent the components of signals $e_2$ at crystals 85A and 85B respectively and similarly vectors $e_{1A}$ and $e_{1B}$ represent the components of $e_1$ at the two crystals. Vectors $e_A$ and $e_B$ represent the net resultant vectors at the two crystals. As is known by those familiar with the art, the signals at the two crystals are combined in an appropriate adding circuit to comprise the mixer output.

It should be appreciated that as long as the input frequency to cavity 71 is $f_0$ equaling its tuned frequency zero shift is introduced by the cavity so that $e_1$ and $e_2$ are in phase quadrature and the magnitude of resultants $e_A$ and $e_B$ are equal. Therefore the output of the mixer is zero volts which may be thought of as a zero AC output. On the other hand, when the input frequency to cavity 71 is no longer $f_c$, the cavity 71 produces a phase shift so that $e_1$ and $e_2$ are no longer in phase quadrature as shown in FIGURE 8 wherein the signal components at each crystal are no longer in phase quadrature. As a result, the resultants $e_A$ and $e_B$ are of different magnitudes so that the mixer produces an AC output.

In accordance with the teachings of the present invention, the output of mixer 85 is supplied to a wave analyzer 90, which may be the same as analyzer 40, previously described in conjunction with FIGURE 2 so that the same frequency defines the sidebands. The analyzer is tuned to the sideband developed for calibration purposes, such as frequency $f_{sb}$ (FIGURE 3) and the reading of the analyzer is recorded. This reading represents the output of the measuring circuit when the carrier-to-sideband power ratio is 60 db at the particular sideband frequency. Let it be assumed that the phase shift introduced by cavity 71 as a function of frequency deviation from the tuned frequency $f_t$ is linear about $f_t$, as indicated by the straight part 82s of line 82 in FIGURE 5. Then, once the output of analyzer 90 at the sideband frequency $f_{sb}$ at a signal-to-noise ratio of 60 db is known, the expected output at other frequencies from $f_c$ at a 60 db signal-to-noise ratio may be linearly interpolated. For example, if the sideband frequency $f_{sb}$ is 10 kc. and the calibrated carrier-to-sideband power is 60 db and the output of analyzer 90 is a reading of 10 millivolts (mv.), then at 100 kc., the expected output at 60 db would be 100 mv. and at 1 mc. the expected output would be 1 volt. The expected output at a carrier-to-sideband power at 60 db for all frequencies may be verified by generating a second pair of sidebands and measuring the output of the analyzer therefor. This is conveniently accomplished by varying the modulation signal derived from wave analyzer 40 (FIGURE 2) supplied to the balanced modulator 35, so that the output of the latter circuit is of the desired frequency.

After the expected outputs of analyzer 90 at frequencies removed from the carrier frequency $f_c$ are determined for 60 db carrier or signal-to-noise ratio, the carrier signal to be examined rather than the calibrated signal is supplied to input terminal 75. The wave analyzer 90 is tuned to different frequencies with the output thereof at each frequency indicating the ratio of the carrier frequency to a noise frequency at the particular tuned frequency. It should be pointed out that the output of analyzer 90 represents the noise about a minimum bandwidth, such as 1 kc., rather than the noise at a particular unique frequency.

Let it be assumed for example that when the calibrated signal, in which the sideband $f_{sb}$, assumed to be 10 kc., is 60 db below the carrier $f_c$, is supplied to terminal 75 and the analyzer 90 is tuned to $f_{sb}$, the output of analyzer 90 is 10 mv. Then, the expected outputs of analyzer 90 for all other frequencies may be diagrammed by line 100 as shown in FIGURE 9. Therein, frequency is plotted along the abscissa and the output of analyzer 90 along the ordinate. After the expected values are established, the actual noise spectrum about the carrier frequency may be measured by simply tuning the analyzer to different frequencies and reading the output thereof. Thus for example, if at 10 kc. the reading is 5 mv., it indicates a signal-to-noise ratio of 66 db at 10 kc. away from the carrier frequency, since 10 mv. at 10 kc. represent a signal-to-noise ratio of 60 db, while a reading of 25 mv. at 100 kc. indicates that the signal-to-noise ratio is 12 db below the 60 db calibrated value, i.e. 72 db, since at 100 kc., 100 mv. represents 60 db carrier-to-noise ratio.

From the foregoing, it should thus be appreciated that the frequency separation from the carrier at which noise measurements may be made is limited only by the wave analyzer. In the case of a Hewlett-Packard 310A wave analyzer, the maximum separation is 1.5 mc. Also in the present invention the linearity of calibration is determined by the bandpass of the cavity. One of the most significant features of the invention is the fact that the carrier frequency about which the spectrum noise is to be measured is used to provide the calibrating signals. Another unique feature of the calibrating procedure is the fact that the calibration sideband power is measured directly rather than being inferred from observing the nulling of the carrier on an analyzer such as a spectrum analyzer.

In the foregoing, the invention has been described in conjunction with measuring absolute FM noise. Relative FM noise measurements may be made by simply bypassing the cavity, supplying the reference frequency to the mixer 85 through variable phase shifter 76 and the frequency to be measured directly to the mixer 85. The present invention may also be utilized for absolute and relative AM noise measurements. For example, absolute AM measurements may be made by connecting the output terminal 23 (see FIGURE 2) of the calibration circuit to a crystal detector 110 shown in FIGURE 10, with the output of the detector being directly supplied to the wave analyzer 90. It is appreciated that the output of detector 110 is the amplitude envelope of the amplitude modulated carrier frequency, so that at each frequency to which the analyzer is tuned, its output represents the carrier-to-noise ratio at the particular frequency.

For relative AM noise measurements, the reference signal is supplied to the balanced mixer 85 through the variable phase shifter 76, while the signal to be measured is supplied to the mixer 85 directly. Phase shifter 76 is adjusted so that the two signal components at one crystal, such as crystal A, are in phase and those at crystal B are 180° out of phase with respect to one another. These signal components are diagrammed in FIGURE 11 where vectors $e_{XA}$ and $e_{XB}$ represent the components at crystals A and B of the reference signal, supplied to the mixer through phase shifter 76 and vectors $e_{YA}$ and $e_{YB}$ represent the components of the signal directly supplied to the mixer.

In absolute FM noise measurements, the RMS output voltage of the balanced mixer 85 (FIGURE 4) can be shown to be given by:

$$V_{rms} = 2\sqrt{2} Q_L V_{dc} \left(\frac{f_m}{f_o}\right) 10^{-\frac{db_n}{20}}$$

where $Q_L$ is the loaded Q of the cavity 71, $V_{dc}$ is the DC output voltage of each of the two crystals 85A and 85B of mixer 85 (FIGURE 6), $f_m$ is the FM sideband frequency, $f_o$ is the carrier frequency and $db_n$ is the carrier-to-FM sideband power ratio in db in a given bandwidth.

There has accordingly been shown and described herein a novel system for measuring the noise spectra of microwave signals close to a main signal frequency. The main signal frequency itself is used to generate a calibration signal which is used to calibrate the measuring circuit of the system so that the noise spectra may be measured with respect thereto. It is appreciated that those familiar with the art may make modifications in the arrangements as shown without departing from the true spirit of the invention.

What is claimed is:

1. A system for measuring the ratio of the power of a carrier frequency to the power of noise of a predetermined frequency separation from said carrier frequency over a selected bandwidth comprising:

calibration means responsive to a carrier frequency of an adjustable amplitude to generate a pair of sideband signals at selected frequencies separated by known magnitudes from said carrier frequency, said calibration means including means for adjusting the amplitudes of said sideband signals with respect to the amplitude of said carrier frequency; and measuring means including a tunable cavity responsive to said carrier frequency and said sideband signals for providing a first output, the phase characteristics of which are functions of the carrier frequency and said sideband signals, adjustable phase shifting means responsive to said carrier frequency and the sideband signals thereof for providing a second output, and output means responsive to said first and second outputs for providing a third output the amplitude of which is related to the ratio of said carrier frequency to said sideband signals, said measuring means being further responsive to said carrier frequency and noise of unknown amplitude for providing a fourth output the amplitude of which is related to the ratio of said carrier frequency to said noise.

2. The system defined in claim 1 wherein said output means include a wave analyzer selectively adjusted to respond to frequencies in a predetermined range over said selected bandwidth, whereby said output means is controlled to provide said fourth output the amplitude of which is related to the ratio of said carrier frequency and noise at a predetermined frequency separation from said carrier frequency, said frequency separation not exceeding said predetermined range.

3. A system for measuring absolute frequency modulation (FM) noise at selected frequency separations from a carrier frequency comprising:

first means responsive to a carrier frequency for generating sideband signals at a selected frequency separation from said carrier frequency and at a selected carrier-to-sideband power ratio;

a measuring circuit including a cavity of a selected resonant frequency for providing a first output and a variable phase shifter responsive to said generated sideband signals and said carrier frequency for providing a second output, said phase shifter being adjustable whereby said first and second outputs are in phase quadrature when the input frequency of said cavity equals the resonant frequency thereof, said measuring circuit further including a balanced mixer responsive to the phase of said first and second outputs for providing a third output, the characteristics of which are a function of the frequency separation from said carrier frequency of the input signal to said cavity and phase shifter and the power ratio therebetween; and a wave analyzer responsive to said third output for providing a measure of the noise at selected frequency separations from said carrier frequency as a function of the characteristics of said third output.

4. The measuring system defined in claim 3 wherein said first means includes means responsive to said carrier frequency for adjusting the power thereof to a selected value;

balanced modulator means responsive to said carrier frequency for generating sideband signals at a selected frequency separation and at a selected power ratio with respect to said carrier frequency; and variable phase shifting means for adjusting the phase relationship between said carrier frequency and said sideband signals to either frequency modulate or amplitude modulate said carrier frequency.

5. The measuring system defined in claim 4 wherein said first means further includes a crystal detector and alternating current metering means for indicating the type of modulation of said carrier frequency.

6. The measuring system defined in claim 4 further including a variable attenuator coupled to said source of carrier frequency and to the output of said balanced modulator for nulling the effect of carrier frequency leakage at the modulator's output.

7. A calibration circuit for providing a pair of sidebands of a carrier frequency at a selected carrier-to-sideband ratio comprising:
   a source of a carrier frequency;
   an output terminal;
   a first attenuator disposed between said source and said output terminal for adjusting the power level of said carrier frequency to a predetermined value;
   a balanced modulator;
   means for coupling said modulator to said source of carrier frequency;
   a source of a modulating signal of a selected frequency coupled to said modulator to generate a pair of sidebands of said carrier frequency at frequencies which are a function of the selected frequency of said modulating signal;
   means for coupling said sidebands to said output terminal;
   means for controllably attenuating the sideband power at said output terminal to control the carrier-to-sideband power ratio thereat; and
   means for controllably injecting said carrier frequency at the output of said modulator to null carrier frequency leakage through said modulator.

8. The calibration circuit defined in claim 7 including a variable phase shifter disposed between said modulator and said source of carrier frequency to adjust the phase relationships of said carrier frequency and said sidebands of said output terminal whereby said sidebands either frequency modulate or amplitude modulate said carrier frequency.

References Cited

UNITED STATES PATENTS

| | | | |
|---|---|---|---|
| 3,084,329 | 4/1963 | Clay | 332—44 X |
| 3,238,472 | 3/1966 | Crompton-Couvela | 332—44 |
| 3,384,818 | 5/1968 | Longerich et al. | 324—82 |
| 2,682,033 | 6/1954 | Smullin | 324—58 |
| 2,813,251 | 11/1957 | Brown et al. | 324—58 X |
| 2,927,272 | 3/1960 | Gates et al. | |
| 2,939,076 | 5/1960 | Dropkin | 324—84 X |
| 3,122,704 | 2/1964 | Jones. | |
| 3,287,646 | 11/1966 | Taylor | 324—82 X |
| 3,350,643 | 10/1967 | Webb. | |

GERARD R. STRECKER, Primary Examiner

P. F. WILLE, Assistant Examiner